July 1, 1924.

A. T. KASLEY 1,499,618

SHAFT COUPLING

Filed July 12, 1921    2 Sheets-Sheet 1

A. T. Kasley
INVENTOR

BY  A. C. Davis
ATTORNEY

July 1, 1924.

A. T. KASLEY 1,499,618

SHAFT COUPLING

Filed July 12, 1921   2 Sheets-Sheet 2

A. T. Kasley
INVENTOR

BY D. C. Davis
ATTORNEY

Patented July 1, 1924.

1,499,618

UNITED STATES PATENT OFFICE.

ALEXANDER T. KASLEY, OF ESSINGTON, PENNSYLVANIA, ASSIGNOR TO WESTINGHOUSE GEAR AND DYNAMOMETER COMPANY, A CORPORATION OF PENNSYLVANIA.

SHAFT COUPLING.

Application filed July 12, 1921. Serial No. 484,071.

*To all whom it may concern:*

Be it known that I, ALEXANDER T. KASLEY, a citizen of the United States, and a resident of Essington, in the county of Delaware and State of Pennsylvania, have invented a new and useful Improvement in Shaft Couplings, of which the following is a specification.

My invention relates to couplings for connecting together rotatable elements and it has for its object to provide apparatus of the character designated which shall permit of relative longitudinal and angular movements of the members, with little end thrust, and which shall be capable of operating to transmit high powers efficiently at high speeds.

Apparatus embodying features of my invention is illustrated in the accompanying drawings, forming a part of this application, in which—

The present invention is an improvement in part on the form of coupling disclosed in Patent No. 1,208,252, granted December 12, 1916, to the Westinghouse Gear & Dynamometer Company, on an application filed by George Westinghouse. The coupling disclosed in this patent comprises a pair of telescopic coupling members adapted for connection to suitable rotary elements or shafts and provided with opposed semicylindrical recesses or channels to receive balls which serve to connect the telescopic members in power transmitting relationship. A coupling of this character permits of sufficient play to make it highly desirable in certain fields where play is practically necessary, for example, for connecting a steam turbine to a generator, where one rotor shaft may move relatively to the other in operation slightly either longitudinally or transversely.

In practice, however, the coupling disclosed in this patent is, at times, subject to two defects, namely when operating at high speeds, large centrifugal forces are developed on account of masses of the transmitting balls, and there is a tendency of the balls to work to the ends of the opposed cylindrical recesses, resulting in a large amount of sliding friction and consequent thrust. Accordingly, it is the object of my invention to devise a coupling in which these disadvantages are avoided. Centrifugal forces are reduced by providing transmitting members in the form of disks with spherically-faced edges instead of balls. End thrust is reduced by the provision of suitable stop members which cooperate with the spherically-edged transmitting members or disks to reduce the amount of sliding motion over that which takes place in the form of the ball type of coupling referred to.

In carrying out my invention, I provide a pair of coupling members with interfitting portions together with interposed spherically-edged transmitting members or disks which transmit the load from one coupling member to the other. The spherically-edged members may act either in shear or under compression.

Figure 1:
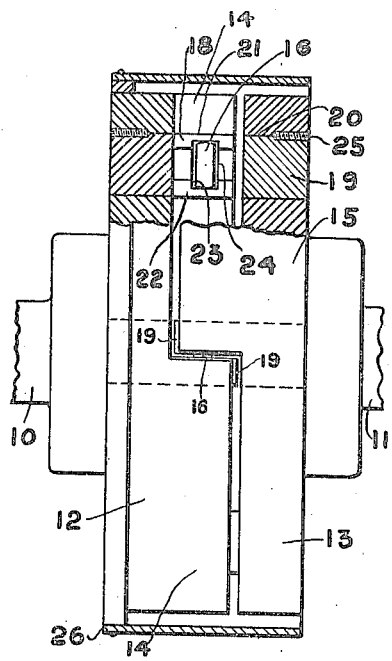
Fig. 1 is a view, partially in section and partially in elevation, of my improved form of coupling.

Referring now to the drawings for a more detailed description of my invention, in Fig. 1, I show rotatable elements, for example, shafts 10 and 11 having secured thereto in any suitable manner coupling members 12 and 13, the latter having interfitting segmental portions 14 and 15, respectively. Load transmitting disks 16 having spherically-faced edges are interposed between adjacent radial faces of the interfitting segmental quadrant portions, the disks being arranged transversely of the coupling members so that the load is transmitted from one member to the other by compression of the effective disks, it being understood that, in the construction as illustrated, only two disks will be effective in transmitting the load with a single direction of rotation, assuming one of the shafts be the driving element, the other pair of disks being effective to transmit the load upon reversal of motion of a given driving shaft or upon the other shaft becoming the driving shaft with the same direction of rotation.

Bushing elements 18 are preferably provided for the spherically-edged transmitting disk elements 16 so as to provide suitable bearing surfaces for the latter and for convenience in assembly and maintenance of the parts in operative relation. The bushing elements 18 are provided with cylindrical ends 19 fitting cylindrical openings 20 provided in the coupling members. A semi-cylindrical recess 21 is provided in each radial face of the interfitting quadrant projections and in alinement with the cylindrical openings 20, the semi-cylindrical seat portion 22 of each bushing member 18 being seated within a semi-cylindrical recess 21. Each semi-cylindrical seat portion 22 is provided with a semi-cylindrical recess 23, constituting a bearing seat for a transmitting disk member 16, and stop portions 24 are provided on each side of each seat 22 and spaced apart a distance suitably in excess of the thickness of the transmitting disk portion 16 for a purpose to be described.

Any suitable means, may be used for holding the bushing members 18 in place, for example, screws 25, may be provided, for cooperation with the portions 19 to maintain the bushing members 18 in assembled relation with respect to the coupling members 12 and 13.

Figure 3:
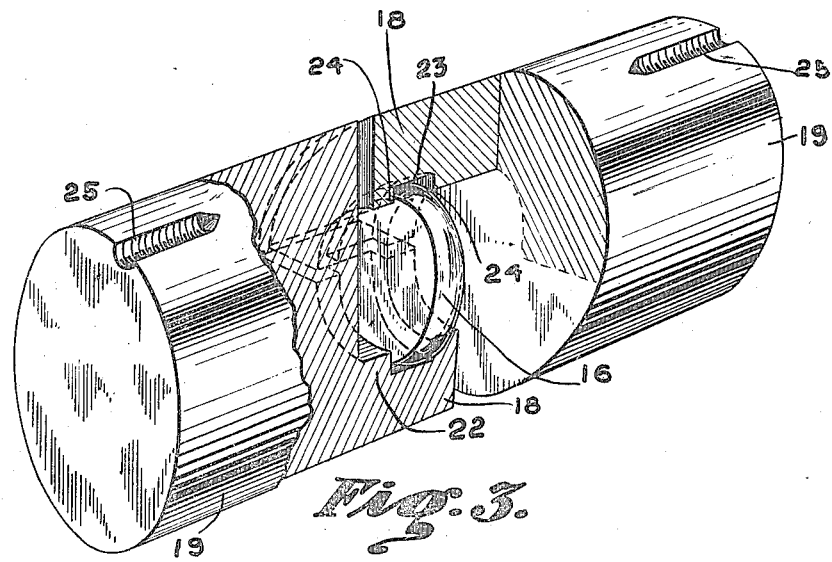
Fig. 3 is a perspective view on an enlarged scale of one of the connecting devices.

As may be seen from Fig. 3, a pair of bushing members 18 and an interposed transmitting disk member 16 may be assembled as a unit which is desirable from the standpoint of assembly. For example, I may assemble my improved form of coupling by bringing the coupling members 12 and 13 into such relative positions that the segmental quadrant portions interfit and the openings and recesses 20 and 21 in opposing coupling members are in alinement and then the assembled units referred to may be easily slipped through the opening and recess of one coupling member and into the opening and recess of the other coupling member, fastening means thereafter being inserted to hold the bushing members permanently in place.

A suitable guard 26 may be provided in order to protect the elements of the coupling against the entry of extraneous matter.

It will be obvious, from the construction so far described, that the elements of my coupling are capable of so moving as to allow for longitudinal or angular displacement of one connected element with respect to the other. If pure longitudinal displacement takes place, the disk members merely rock about their spherically shaped faces on the seats 23. If angular displacement takes place, the disk members not only rock but also serve as pivotal connections.

The stop portions 24 cooperate with the disk member 16 not only to assist in maintaining all parts in assembled relation but also to secure an improved mode of operation. The latter result will be more evident from an inspection of diagrammatic Figures 7 and 8.

Figure 7:
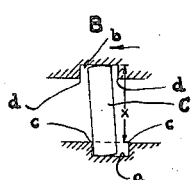
Figs. 7 and 8 are diagrammatic views to indicate a phase of the mode of operation.

In Fig. 7, relatively longitudinally movable elements A and B are shown provided with recesses $a$ and $b$, defined by the shoulders $c$ and $d$. A rocker C, with spherically-faced ends, is interposed between the members A and B. Within limits and with the rocker free of the shoulders, it is obvious that the members A and B may be relatively moved with only rolling motion taking place with respect to the rocker C. If it is assumed that the rocker is in contact with the left hand shoulder $c$ of the member A and the member B is moved to the left, as indicated by the arrow, it will be obvious that the rocker is not free to roll within the recess $a$ on account of contact with the shoulder $c$; however, it is obvious that rolling motion may take place with respect to the member B. If, then, the member B is moved to the left as stated, the rocker C is acted upon by the shoulder $c$ as a fulcrum and slides in the recess $a$, the moment arm $x$ being effective for this purpose. It is obvious then that the force of friction has very little effect on account of the large moment arm to effect sliding. Of course, the rocker rolls in the recess $b$ when the element B is moved in the manner stated.

Figure 8:
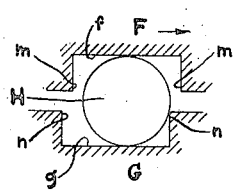

Referring now to Fig. 8, which shows members F and G, with cooperating recesses $f$ and $g$, and an interposed transmitting ball H arranged therein, the recesses being provided with end walls or retaining members $m$ and $n$, if it is assumed that the ball H is at one end of the recess $g$ and in contact with the wall $n$, it is obvious that movement of the member F to the right takes place only with sliding motion and consequently the frictional force encountered is much greater than with the construction in Fig. 7.

From a consideration of diagrammatic views 7 and 8, the proposition that my improved form of coupling operates with a small amount of friction, and consequently a small amount of end thrust, will be obvious. In other words, when my improved form of coupling is compared with the structure of patent to Westinghouse, aforesaid, it will be seen that, at times, the spherically-edged transmitting member or disk 20 may have sliding motion with respect to one quadrant member and rolling motion with respect to the opposed cylindrical quadrant member, whereas, in the Westinghouse construction, under a similar condition, no rolling motion takes place at all, all motion being a relative sliding motion. Obviously then, to the extent that I have reduced sliding motion and to the extent that I have introduced mechanism which is capable of accomplishing the sliding motion with great mechanical advantage, I have reduced the amount of friction and end thrust over the Westinghouse construction.

Figures 4, 5:
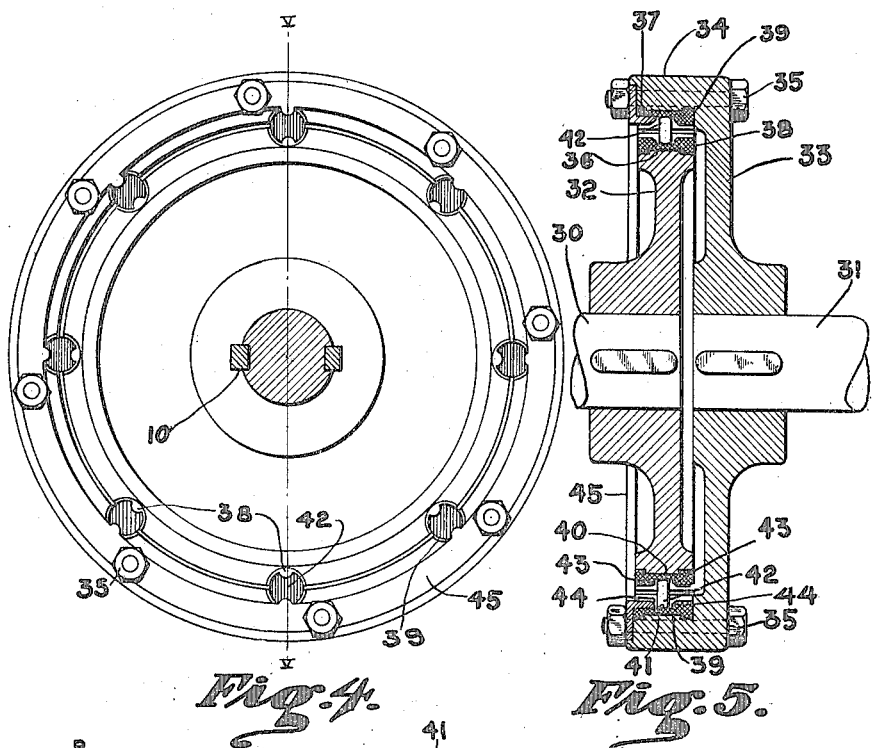
Fig. 4 is an end elevation of a modified form of my coupling.
Fig. 5 is a sectional view taken along the line V—V of Fig. 4.
Figure 6:
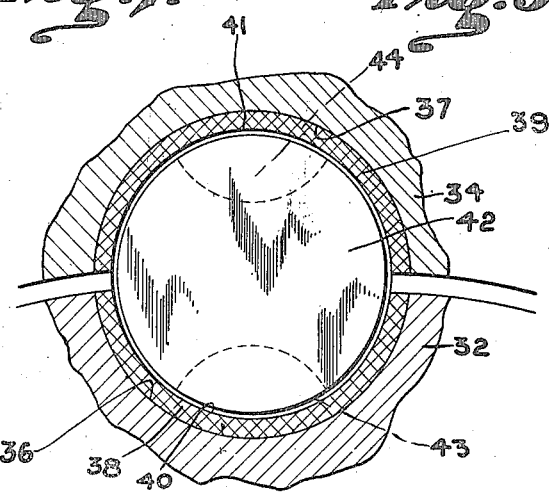
Fig. 6 is an enlarged sectional detail view showing one of the transmitting elements used in Fig. 4.

Figs. 4, 5 and 6 show a modified form of my invention in which the load is transmitted from one coupling member to the other by the transmitting disks or rockers acting in shear. In this modification, which is more like the Westinghouse construction, aforesaid, I show a pair of rotatable elements or shafts 30 and 31 provided with coupling members 32 and 33 having an interfitting or telescopic relationship, the coupling member 33 being preferably provided with a portion 34 which overhangs the coupling member 32.

The opposed cylindrical surfaces of the coupling members 32 and 33 are provided with arcuate recesses 36 and 37 for the reception of bushing elements 38 and 39, respectively, the latter having dovetail connections in the recesses.

The bushing members 38 and 39 are provided with arcuate bearing recesses 40 and 41 for the reception of spherically-edged transmitting disks 42, the inner bushings being provided with stops 43 and the outer bushing being provided with stops 44 spaced apart a distance somewhat in excess of the thickness of the spherically-edged transmitting disks so as to permit the latter to rock upon longitudinal movement of one coupling member relative to the other. The outer series of stops 44 is preferably carried by a ring 45 secured in assembled relation by means of the bolts 35. The latter feature of construction permits of an easy assembly of the apparatus, as the coupling members may be brought into alined relation, the transmitting disks assembled, and the ring 45, with its series of stops 44, then placed in position.

Figure 2:
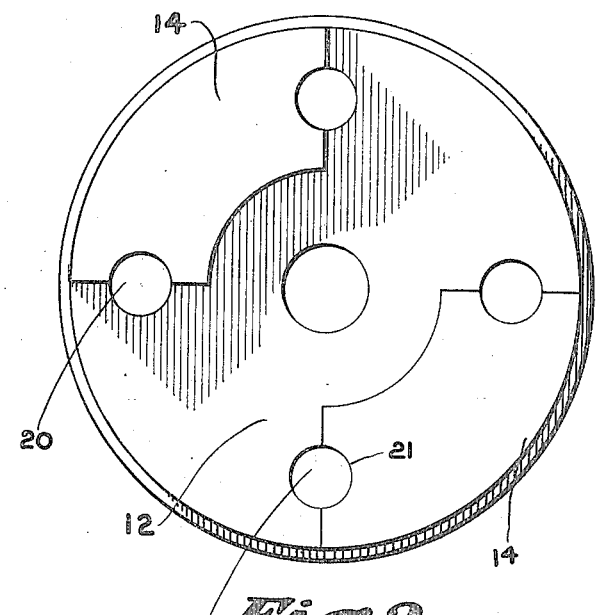
Fig. 2 is an end elevation of one of the coupling members.

The operation of the structure shown in Figs. 4 to 6, inclusive, is substantially the same as that described in Figs. 1 to 3, inclusive, except that the load is transmitted in shear instead of in compression. In either case, displacement of one coupling member may take place with respect to the other with a mere rolling motion of the transmitting disks or rockers, the stops serving to accomplish sliding motion, when the latter is unavoidable, with a minimum amount of friction.

It will therefore be seen that I have devised a coupling which is capable of transmitting high power at high speeds and which may allow of displacement of one coupling member relatively to the other with the development of a small amount of friction and consequent end thrust.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. A coupling for a pair of rotatable elements comprising a pair of coupling members having opposed recesses and disk-shaped transmitting members in the recesses having spherically-shaped edges bearing against the recesses.

2. A coupling for a pair of rotatable elements comprising a pair of coupling members having interfitting portions provided with opposed recesses and disk-shaped transmitting members in the recesses having spherically-shaped edges bearing against the recesses.

3. A coupling for a pair of rotatable elements comprising a pair of coupling members having opposed approximately semi-cylindrical recesses and disk-shaped transmitting members in the recesses having spherically-shaped edges bearing against the recesses.

4. A coupling for a pair of rotatable elements comprising a pair of coupling members having opposed approximately semi-cylindrical recesses, each recess having opposed spaced stops, and disk-shaped transmitting members in the recesses having spherically-shaped edges bearing against the recesses and arranged between the stops with sufficient play therebetween to allow for rocking motion of the transmitting members in the recesses.

5. A coupling for a pair of rotatable elements comprising a pair of coupling members having opposed approximately semi-cylindrical recesses, disk-shaped transmitting members in the recesses having spherically-shaped edges bearing against the recesses, and stops arranged in each of the recesses on opposite sides of a transmitting member and being spaced apart a distance greater than the thickness of a transmitting member.

6. A coupling for a pair of rotatable elements comprising a pair of coupling members having opposed recesses and disk-shaped transmitting members in the recesses having contacting edges which are elements of spheres taken about the centers of the transmitting members.

7. A coupling for a pair of rotatable elements comprising a pair of coupling members having interfitting portions and opposed approximately semi-cylindrical recesses in the portions and arranged substantially parallel to the axes of the respective members, disk-shaped transmitting members having spherically-shaped edges fitting in the recesses, the planes of the disks being disposed transversely to the axis of rotation, and stops cooperating with the discs to limit play of the latter or to assist in sliding movement of the transmitting members, whereby relative longitudinal movement of one member may take place with respect to the other with a small amount of end thrust.

8. A coupling for a pair of rotatable elements, comprising a pair of coupling members having interfitting portions provided with opposed approximately semi-cylindrical recesses arranged substantially parallel to the axes of the respective members, disk-shaped transmitting members, whose edges are spherical elements taken about the centers thereof, fitting in the recesses, the planes of the disks being disposed transversely to the axis of rotation, and stops carried by the coupling members and cooperating with the disks to limit play of the latter or to assist in sliding movement of the transmitting members, whereby relative longitudinal movement of one member may take place with respect to the other with a small amount of end thrust.

9. A coupling for a pair of rotatable elements comprising a pair of coupling members secured to the elements, interfitting projections on the members having opposed radial faces with bearing portions, and disk transmitting members interposed between the faces and fitting the bearing portions.

10. A coupling for rotary elements comprising a pair of coupling members secured to the elements, interfitting quadrant projections carried by the members and having opposed approximately semi-cylindrical recesses, spherically-edged transmitting disks in the recesses, and stop means carried by the projections cooperating to maintain the parts in assembled relation and at times acting as fulcra to secure sliding of the transmitting members relatively to the projections.

11. A coupling for rotary elements comprising a pair of coupling members secured to the elements, interfitting quadrant projections carried by the members and having opposed arcuate recesses, spherically-edged transmitting disks in the recesses, and stop means carried by the projections cooperating to maintain the parts in assembled relation and at times acting as fulcra to secure sliding of the disk members relatively to the projections.

12. A coupling for rotary elements comprising disk members having interfitting projections on the opposed faces thereof, said projections having recesses in the opposed faces thereof, bushing members secured to the disk members and having portions fitting in the recesses, said portions in the recesses being provided with curved seats, and spherically-faced transmitting members cooperating with the seats.

13. A coupling for rotary elements comprising disk members having interfitting projections on the opposed faces thereof, said disk members having openings therein which are alined with recesses in the opposed faces of the projections, bushing members having portions which fit the openings and which fill the recesses, said portions of the bushing members in the recesses having substantially semi-cylindrical seats, and spherically faced transmitting members cooperating with the seats.

14. A coupling for rotary elements comprising disk members having interfitting projections on the opposed faces thereof, said disk members having cylindrical openings therein which are alined with substantially semi-cylindrical recesses in the opposed faces of the projections, bushing members having cylindrical portions which fit the openings and semi-cylindrical portions which fit the recesses, said semi-cylindrical portions of the bushings having curved seats, and spherically-faced transmitting elements arranged in the seats.

15. A coupling for rotary elements comprising disk members having interfitting projections on the opposed faces thereof, said disk members having cylindrical openings therein which are alined with substantially semi-cylindrical recesses in the opposed faces of the projections, bushing members having cylindrical portions fitting in the openings and substantially semi-cylindrical portions fitting in the recesses, means for holding the bushing members in place with respect to the disk members, said substantially semi-cylindrical portions of the bushing members having curved seats, and spherically-faced transmitting members cooperating with the seats.

16. A coupling for rotary elements comprising disk members having interfitting projections on the opposed faces thereof, a flange carried by one of the disk members, bushings arranged in the opposed faces of the projections and having seats, spherically-faced transmitting elements arranged in the seats, and a cover for the coupling secured to said flange.

In testimony whereof, I have hereunto subscribed my name this 30th day of June, 1921.

ALEXANDER T. KASLEY.